US007013935B1

(12) United States Patent
Bonn

(10) Patent No.: US 7,013,935 B1
(45) Date of Patent: Mar. 21, 2006

(54) FAIL SAFE SECONDARY CONTAINMENT SYSTEM FOR A CRYOGENIC LIQUID TRANSPORT PIPELINE

(76) Inventor: John W. Bonn, 3815 Darbyshsire Dr., Hilliard, OH (US) 43026

( * ) Notice: Subject to any disclaimer, the term of this patent is extended or adjusted under 35 U.S.C. 154(b) by 0 days.

(21) Appl. No.: 11/246,723

(22) Filed: Oct. 6, 2005

(51) Int. Cl.
*B65B 1/04* (2006.01)

(52) U.S. Cl. .................. 141/311 A; 141/86; 138/114; 62/50.7

(58) Field of Classification Search ............ 141/311 A, 141/86, 59, 44, 46, 301, 302; 114/230.15, 114/230.19; 441/3–5; 138/114; 62/50.7
See application file for complete search history.

(56) References Cited

U.S. PATENT DOCUMENTS 5,622,212 A * 4/1997 Berger et al. ................ 141/59
6,094,922 A * 8/2000 Ziegler ......................... 62/50.7
6,647,733 B1 * 11/2003 Cooper ......................... 62/50.7

* cited by examiner

*Primary Examiner*—Steven O. Douglas
(74) *Attorney, Agent, or Firm*—Thomas S. Baker, Jr.

(57) ABSTRACT

A fail safe secondary containment system for a cryogenic liquid transport pipeline spool having a mainline liquid transport pipe and a secondary containment pipe which overlies the mainline liquid transport pipe and is affixed to the outer surface of the mainline liquid transport pipe to form a sealed annular containment space therebetween, has a cap mounted on the secondary containment pipe to provide a sealed tertiary space. A first check valve has an inlet connected to the secondary containment space for receiving fluid therefrom and an outlet connected to the tertiary containment space and a second check valve has an inlet connected to the tertiary containment space for receiving fluid therefrom and an outlet connected to the inside of the mainline liquid transport pipe.

8 Claims, 3 Drawing Sheets

FAIL SAFE SECONDARY CONTAINMENT SYSTEM FOR A CRYOGENIC LIQUID TRANSPORT PIPELINE

CROSS-REFERENCES

None.

FIELD OF THE INVENTION

This invention relates to a fail safe secondary containment system for a cryogenic liquid transport pipeline.

BACKGROUND OF THE INVENTION

Cryogenic liquid transport pipelines are used to move super cooled liquidized fluids such are liquid natural gas (LNG). A primary purpose of such a pipeline is to transport super cooled liquidized fluids between large land based storage containers located at a port terminal facility and transport ships in a harbor which carry the liquidized fluids to other ports. Because the draft of a transport ship may be in excess of sixty feet, the ship often must remain a substantial distance from the shore and from the liquidized fluid storage containers. Thus, in some instances cryogenic liquid transport pipelines must be of substantial length which may be in excess of several miles. Such pipelines are constructed of a series of individual spools that are welded together. The spools may be eighty feet or more in length and have diameters of between four inches and thirty-six inches. The pipelines may extend above ground, under ground and/or underwater.

In order to maintain the super cooled condition of a cryogenic fluid within a cryogenic liquid transport pipeline, the pipeline spools are constructed with a central axially extending mainline pipe which carries the super cooled liquidized fluid and a concentric secondary containment pipe from two to six inches larger in diameter than the mainline liquid fluid transport pipe that overlies and is welded to the exterior of the mainline liquid transport pipe. The individual spools are welded together in a series to form a cryogenic liquid transport pipeline of desired length. At each welded spool joint a concentric secondary containment pipe is welded to the adjacent secondary containment pipes for the spools to provide a secondary joint containment space at the spool joint. The secondary containment space for each spool and the secondary joint containment space for the spool joints are evacuated to provide a vacuum insulation for the individual pipe spools and for the pipe spool joints to maintain the super cooled condition of the cryogenic fluid within the liquid transport pipeline.

Secondary containment of a vacuum insulated cryogenic liquid transport main pipe requires special safety measures. Typically the pressure of a cryogenic fluid in a transport pipe is between 5 and 400 pounds per square inch. If a small leak develops in a cryogenic main liquid transport pipe causing cryogenic liquid fluid to pass into an evacuated secondary containment space it will vaporize rapidly when exposed to an ambient temperature environment. This will cause the fluid volume and pressure in the secondary containment space to rapidly increase and possibly cause a catastrophic failure of the pipeline.

There are several methods of protecting a secondary containment space from over pressurizing and causing a failure of the pipeline. One method is to add a relief valve to the secondary containment pipe jacket which would vent gas in the secondary containment space to atmosphere when it reached a set pressure. Of course, this results in a loss of fluid and may be undesirable in some pipeline locations and situations. A second method is add a relief valve to the secondary containment pipe jacket and connect the outlet of the valve to a low pressure manifold that has a common relief device for all pipe spools. This method is undesirable for a number of reasons. It necessitates having external pipes that extend parallel to the pipe spools. This is undesirable inasmuch as should a pipe spool roll during handling or be handled roughly, the external pipe and it attendant relief valves may be damaged. Additionally, passing cryogenic fluid into a low pressure vent manifold will cause the relief valves of the adjacent spools to cool to a very low temperature, which may cause them to leak and thus cause multiple spool failures. Thus, it is desirable to provide a system for protecting the secondary containment space of a cryogenic liquid transport pipeline spool from over pressurizing, that contains any leaks from the cryogenic mainline liquid transport pipe within the secondary containment pipe space of the failed spool, prevents external leaks of fluid to the outside environment, reduces the rate of leakage from the mainline liquid transport pipe and does not require connection to adjacent pipeline spools.

SUMMARY OF THE INVENTION

The instant invention provides a secondary containment system for a primary cryogenic liquid transport pipeline spool that has a mainline liquid transport pipe and a secondary containment pipe which overlies the mainline liquid transport pipe and is welded to the outer surface of the mainline liquid transport pipe to form a sealed secondary containment space between the mainline liquid transport pipe outer surface and the secondary containment pipe. A cap is mounted on the outer surface of the secondary containment pipe to provide a sealed tertiary containment space. A first check valve has an inlet connected to the secondary containment space for receiving fluid therefrom and an outlet connected to the tertiary containment space. A second check valve has an inlet connected to the tertiary containment space for receiving fluid therefrom and an outlet connected to the inside of the mainline liquid transport pipe.

DETAILED DESCRIPTION OF THE PREFERRED EMBODIMENT

Figure 1:
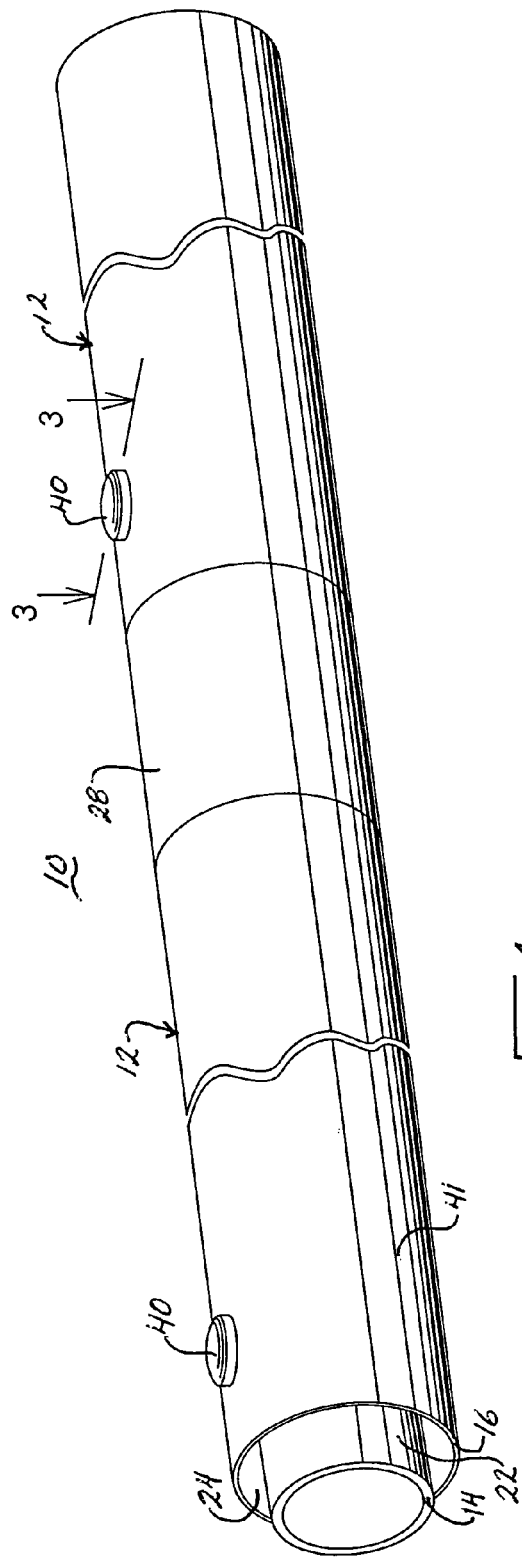
FIG. 1 is a perspective view of a pair of adjacent pipeline spools in a cryogenic liquid transport pipeline.
Figure 2:
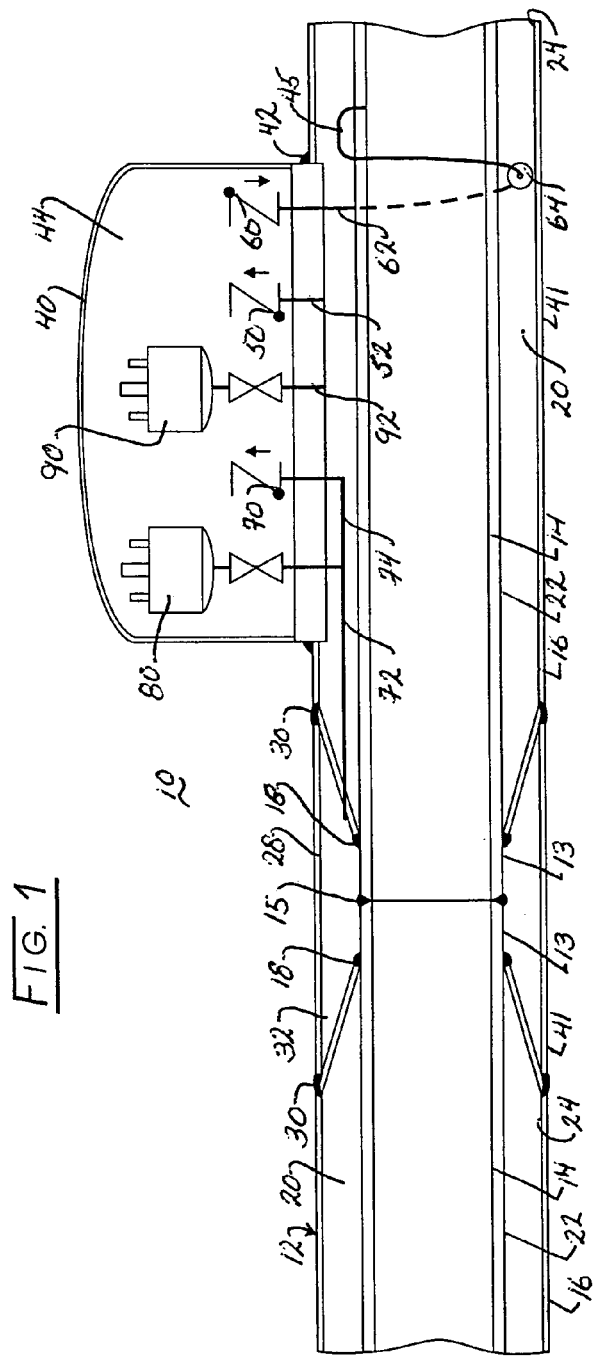
FIG. 2 is a cross-sectional schematic view of a partial pipeline section with the invention shown enlarged.

FIGS. 1 and 2 depict a section of a cryogenic liquid transport pipeline 10 formed from a number of serially connected, self-contained cryogenic liquid transport pipeline spools 12. The spools 12 may have a range of diameters from four inches to thirty-six inches and may be as much as eighty feet or more in length. A cryogenic liquid transport pipeline 10 may have a length in excess of several miles.

Each cryogenic liquid transport pipeline spool 12 is comprised of a central, axially extending mainline liquid transport pipe 14. Preferably, this pipe is constructed of stainless steel, although other alloys capable of withstanding very low temperatures, capable of being welded and corrosion and rust resistant also may be utilized. A concentric, longitudinally extending secondary containment pipe 16 overlies each mainline cryogenic liquid transport pipe 14 and is attached thereto by annular welds 18. Other mechanical attachment means also may be utilized. The secondary containment pipe 16 is spaced from the mainline cryogenic liquid transport pipe 14 by a distance of between two inches and six inches, depending upon the diameter of the mainline cryogenic liquid transport pipe 14, and creates a secondary containment space 20 between the outer surface 22 of mainline cryogenic liquid transport pipe 14 and the inner surface 24 of secondary containment pipe 16. Thus, any cryogenic fluid that passes through a hole or opening in the side wall of mainline cryogenic liquid transport pipe 14 leaks or passes into the secondary containment space 20.

Referring to FIG. 2, it may be seen that the abutting ends 13 of the liquid transport pipes 14 of the pipeline spools 12 are joined by an annular weld 15. A joint containment pipe 28 is welded to the secondary containment pipes 16 of adjacent cryogenic liquid transport pipeline spools 12 at welds 30 to thereby form a secondary joint containment space 32 that overlies the ends 13 of the cryogenic liquid transport pipeline spools 12.

The secondary containment space 20 and the secondary joint containment space 32 are evacuated to thereby provide a vacuum insulation space for the mainline cryogenic liquid transport pipe 14. It has been found that by vacuum insulating a mainline cryogenic liquid transport pipe 14 the temperature of a cryogenic fluid within the pipeline rises very little while transported therethrough.

A potentially very serious problem may arise if the side wall of a mainline cryogenic liquid transport pipe 14 develops an opening or hole. If the opening or hole is sufficiently large to cause the cryogenic fluid within the pipe to rapidly fill the secondary containment space 20 or the secondary joint containment space 32, serious problems are avoided because the fluid does not have time to vaporize and rapidly increase in pressure. In fact, the fluid within the secondary containment space may turn to a solid and act to seal the hole or opening or greatly reduce the loss of any fluid from the mainline transport pipe 14. The very cold cryogenic fluid passing through the mainline cryogenic liquid transport pipe 14 will act to keep any fluid in the secondary containment space 20 at a relatively low temperature. When such a breach is discovered, the pipe spool 12 may be replaced as a unit.

Where a small opening or hole develops in a mainline cryogenic liquid transport pipe 14 and a small amount of cryogenic fluid leaks from liquid transport pipe 14 into secondary space 20 or a secondary joint containment space 32 and increases in pressure sufficiently to quickly close the opening or hole within mainline cryogenic liquid transport pipe 14, the cryogenic fluid within the secondary containment space 20 or secondary joint containment space 32 may rapidly increase in pressure. This rapid increase in pressure could potentially destroy or collapse the mainline cryogenic liquid transport pipe 14. Thus, a safety device is required to prevent a secondary containment space 20 or a secondary joint containment space 32 from becoming over pressurized.

Applicant provides a safety device for the secondary containment system of a primary cryogenic liquid transport pipeline that is self-contained within each liquid transport pipeline spool 12, does not vent any cryogenic liquid to the atmosphere, and does not interact with adjacent pipeline spools, and acts to reduce the flow of fluid from the damaged liquid transport pipe.

Referring to the drawing figures, it may be seen that a cap 40 is affixed to the exterior surface 41 of the secondary containment pipe 16 of each liquid transfer pipeline spool 12. The cap 40 preferably is affixed to secondary containment pipe 16 by welds 42. Properly secured to the exterior surface 41 of secondary containment pipe 16, cap 40 defines an enclosed, sealed, tertiary containment space 44 that overlies a portion of the secondary containment pipe 16.

A first check valve 50 is mounted within the tertiary containment space 44, has an inlet connected to a secondary containment space 20 through a bore or line 52 and an outlet connected the tertiary containment space 44. A spring in check valve 50 adjusts the setting of the check valve 50 such that it will remain closed until the pressure within the secondary containment space 20 rises to approximately 15 pounds per square inch above the pressure of the fluid within the mainline cryogenic liquid transport pipe 14. It is desirable to allow the pressure within the secondary containment pipe space 20 to increase slightly above that of the fluid within transport pipe 14 to slow the flow of fluid into the containment space and contain the leak within a single pipe spool. Of course, the operation of check valve 50 has no affect on the operation of the adjacent pipe spools 12.

A second check valve 60 is mounted within tertiary containment space 44, has an inlet connected to tertiary containment space 44 and an outlet connected downstream to the inside of mainline cryogenic liquid transport pipe 14 through a line 62. Line 62 passes from the top of mainline cryogenic liquid transport pipe 14 around one side to the bottom thereof and back into the top of mainline cryogenic liquid transport pipe 14 to thereby form a vapor trap 45 which will maintain check valve 60 at ambient temperature even when mainline cryogenic liquid transport pipe 14 is filled with cryogenic fluid. Line or tube 62 is of extended length to reduce the conductive heat transfer between ambient temperature check valve 60 and mainline cryogenic liquid transport pipe 14. Additionally, an insulator 64 which may be formed from a glass-filled, expoy resin material acts to space and isolate line or tube 62 from secondary containment pipe 16 to thereby further assist in reducing any conductive heat transfer between the secondary containment pipe 16 and mainline cryogenic liquid transport pipe 14. Second check valve 60 has a spring which prevents the valve from opening until the fluid pressure within the tertiary containment space 44 reaches a set level which typically is approximately 15 to 20 pounds per square inch above the pressure of fluid in mainline liquid transport pipe 14.

A third check valve 70 is mounted within the tertiary containment space 44, has an inlet connected to the secondary joint containment space 32 through lines 72 and 74 and an outlet connected to the tertiary containment space 44. As in the case of first check valve 50, a spring prevents the third check valve 70 from opening until the pressure within the secondary joint containment space 32 is approximately 15 pounds per square inch above the pressure of the fluid within the mainline cryogenic liquid transport pipe 14.

From the above, it may be seen that when the pressure in the secondary containment space 20 or the secondary joint containment space 32 becomes 15 pounds per square inch greater than the pressure of the fluid within the mainline cryogenic liquid transport pipe 14, one or both of the first or third check valves 50 and 70 will open to thereby cause the fluid within the respective secondary containment spaces 20 and/or 32 to pass into the tertiary containment space 44. When this occurs, fluid pressure within the tertiary containment space 44 rises. When the fluid pressure becomes approximately 15 to 20 pounds per square inch greater than that of the pressure of the fluid within the mainline cryogenic liquid transport pipe 14, second check valve 60 opens and passes the fluid that has leaked from one or both secondary containment spaces 20 and 32 back into the mainline cryogenic liquid transport pipe 14. Thus, it can be seen that applicant's improved safety design for a secondary containment system causes any fluid leaked because of a failure of a mainline cryogenic liquid transport pipe 14 to be contained within the secondary containment pipe 16 of the failed spool 12 and ultimately delivered back to the mainline cryogenic liquid transport pipe 14. This system provides secondary containment of the cryogenic fluid with no external leak to the outside environment and functions to reduce the flow of fluid from the breached liquid transport pipe 14.

As previously mentioned, the first and third check valves 40 and 70 are provided with a compression spring which will open only if the desired pressure across the check valve is reached. In typical above ground and underground installations, the setting is approximately 15 pounds per square inch above that of the fluid in the mainline cryogenic liquid transport pipe 14. However, in an underwater environment, the check valve compression spring is set at 10% to 20% above the static head pressure of the water depth. This is to ensure that if there is a breach of the secondary containment space and water enters the secondary containment space 20 or the secondary joint containment space 32, the first and third check valves 50 and 70 will not open and allow water to enter the tertiary containment space 44. This is especially important in a system where cryogenic vent lines operate at a very low pressure. In some cases, the pressure of the mainline cryogenic liquid transport pipe 14 is substantially the same as the large storage tanks for the cryogenic fluid. This pressure could be as low as two to three pounds per square inch, and if the compression spring for the check valves 50 and 70 is not set above the seawater static head pressure, it is possible for the water to pass through both check valves connected to the secondary containment spaces 20 and 32 and the check valve 60 connected between the tertiary containment space and the mainline cryogenic liquid transport pipe 14 and thereby allow the water to enter into the mainline cryogenic liquid transport pipeline particularly if that line is near ambient temperature when the jacket pipe is breached. This would be a line failure that would require replacement of the entire line. Most liquid natural gas lines normally operate above the static head of the sea water depth, which would prevent sea water from entering the mainline cryogenic liquid transport pipe 14. Also, during normal operation of a cryogenic liquid transport pipeline 10 all submerged lines are maintained at normal liquid natural gas temperature. If a mainline liquid transport pipe 14 is breached and sea water enters a secondary containment space 20 and 32, all water would be quickly frozen in the containment space.

It should be noted that the first and third check valves 50 and 70 also provide ports for connecting vacuum pumps to evacuate the secondary containment space 20 and the secondary joint containment space 32.

Figure 3:
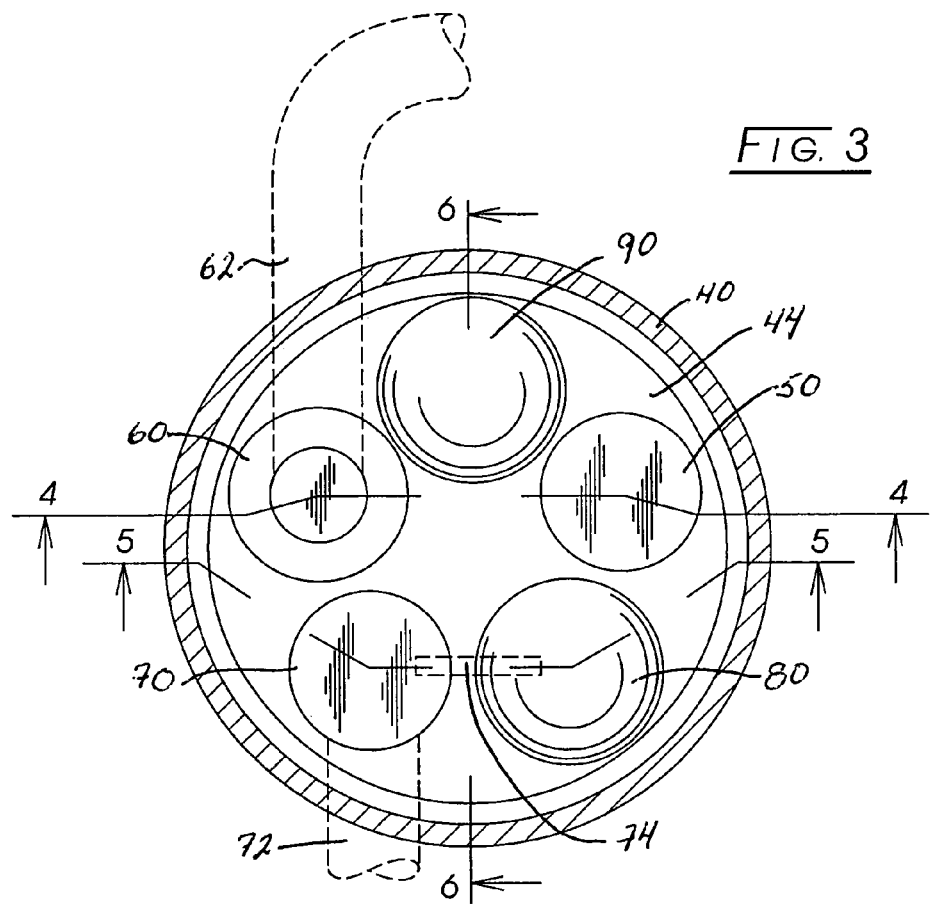
FIG. 3 is a sectional view along line 3—3 of FIG. 1.
Figure 4:
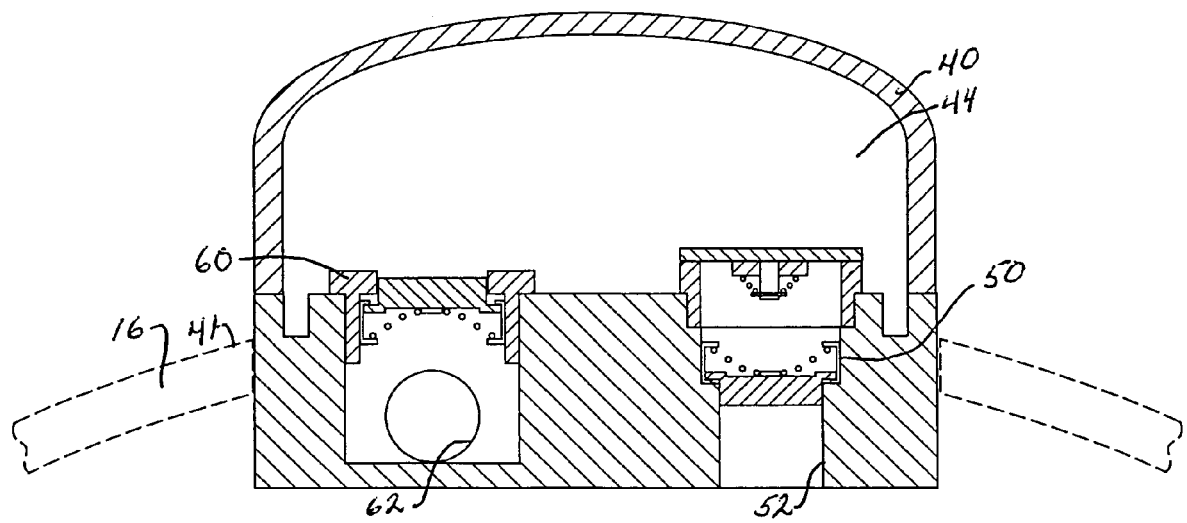
FIG. 4 is a sectional view along line 4—4 of FIG. 3.
Figure 5:
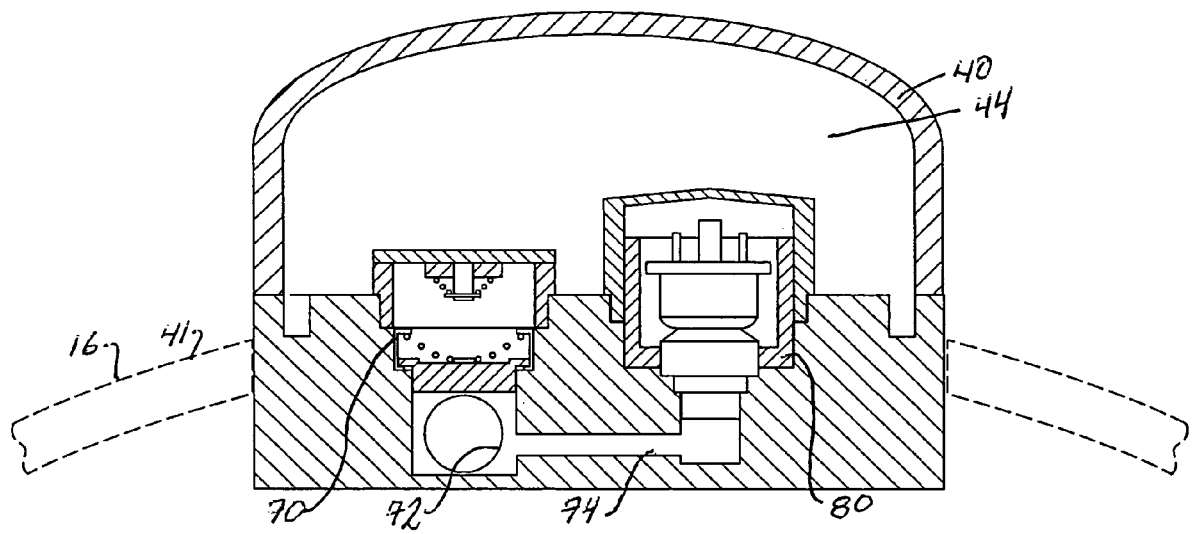
FIG. 5 is a sectional view along line 5—5 of FIG. 3.
Figure 6:
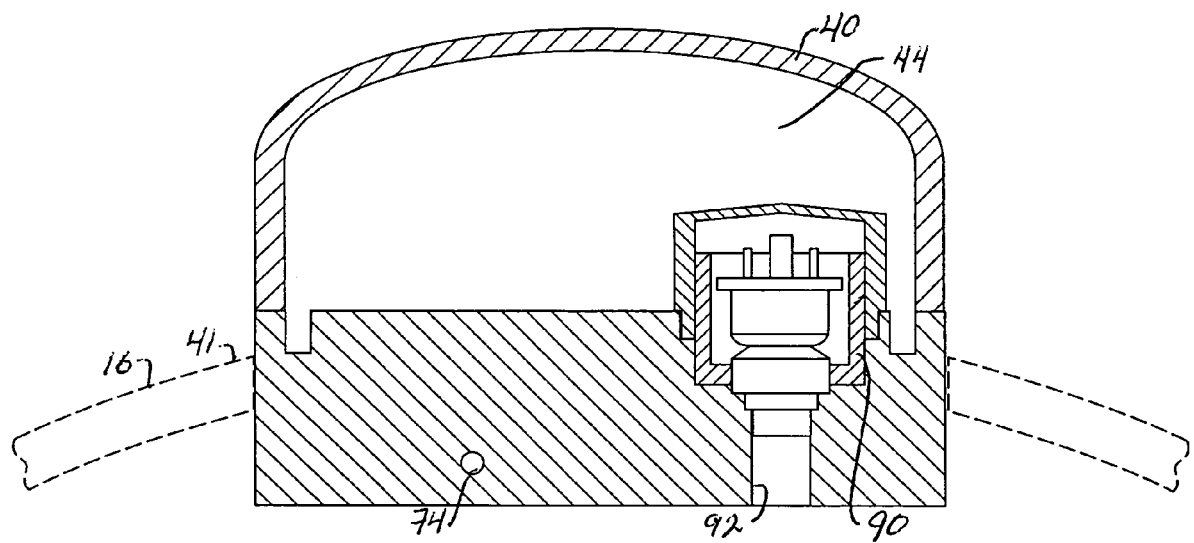
FIG. 6 is a sectional view along line 6—6 of FIG. 3.

Turning to FIGS. 2, 3 and 5, it may be seen that a line 74 connects a pressure gauge 80 mounted within the tertiary containment space 44 to the inlet of relief valve 70. Pressure gauge 80 provides a means for reading the pressure in the secondary joint containment space 32. Similarly, a line or tube 92 connects a pressure gauge 90 mounted within the tertiary containment space 44 to the secondary containment space 20. Pressure gauge 90 reads the pressure within the secondary containment space 20. Obviously, the pressure gauge connections and the pressure gauges 80 and 90 are used to check the pressures within the secondary containment spaces 20 and 32 before cap 40 is welded to the exterior of secondary containment pipe 16.

Applicant's improved design for a secondary containment pipe may be used on mainline cryogenic liquid transport pipeline spools 12 in all installation applications, whether above ground, underground or underwater.

Various changes may be made to the size, shape, and relative proportions of the different invention elements disclosed and described herein without departing from the scope, meaning, or intent of the claims which follow.

I claim:

1. A secondary containment system for a primary cryogenic liquid transport pipeline spool which comprises:
    a mainline liquid transport pipe;
    a secondary containment pipe which overlies said mainline liquid transport pipe and is affixed to the outer surface of the mainline liquid transport pipe to form a secondary sealed containment space between said mainline liquid transport pipe outer surface and said secondary containment pipe;
    a cap mounted on said secondary containment pipe to provide a sealed tertiary containment space;
    a first check valve having an inlet connected to said secondary containment space for receiving fluid therefrom and an outlet connected to said tertiary containment space; and
    a second check valve having an inlet connected to said tertiary containment space for receiving fluid therefrom and an outlet connected to the inside of said mainline liquid transport pipe.

2. The secondary containment system of claim 1 wherein said first and second check valves are mounted in said tertiary containment space.

3. The secondary containment system of claim 1 further comprising an isolation tube connected to said second check valve outlet and a cryogenic vapor trap formed in said isolation tube to prevent liquid in said mainline liquid transport pipe from contacting said second check valve.

4. The secondary containment system of claim 1 wherein said cap is affixed to the outer surface of said secondary containment pipe.

5. The secondary containment system of claim 1 further comprising a spring which biases said first check valve to a closed position to provide a minimum set pressure that must be present in said secondary containment space before fluid will flow through said first check valve.

6. The secondary containment system of claim 1 further comprising a spring which biases said second check valve to a closed position to provide a minimum set pressure that must be present in said tertiary containment space before fluid will flow through said second check valve.

7. The secondary containment system of claim 1 further comprising:
    a cylindrical joint containment pipe which overlies the ends of adjacent mainline cryogenic liquid transport pipeline spools and is affixed to the outer surface of said adjacent pipeline spools to form a sealed joint containment space between said outer surface of said mainline cryogenic liquid transport pipeline spools and said joint containment pipe;
    a third check valve having an inlet connected to said joint containment space for receiving fluid therefrom and an outlet connected to said tertiary containment space.

8. The secondary containment system of claim 7 further comprising a third spring biasing said third check valve to a closed position to provide a minimum set pressure that must be present in said joint containment space before fluid will flow through said third check valve.

* * * * *